United States Patent
Zhou (10) Patent No.: US 10,306,398 B2
(45) Date of Patent: May 28, 2019

(54) METHOD, SYSTEM, POSITIONING CENTER FOR LOCATING A TERMINAL AND NON-TRANSITORY COMPUTER STORAGE MEDIUM

(71) Applicant: ZTE CORPORATION, Shenzhen (CN)

(72) Inventor: Gongcai Zhou, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 15/318,124

(22) PCT Filed: Aug. 19, 2014

(86) PCT No.: PCT/CN2014/084709
§ 371 (c)(1),
(2) Date: Jan. 9, 2017

(87) PCT Pub. No.: WO2015/188446
PCT Pub. Date: Dec. 17, 2015

(65) Prior Publication Data
US 2017/0171701 A1    Jun. 15, 2017

(30) Foreign Application Priority Data
Jun. 12, 2014    (CN) .......................... 2014 1 0262065

(51) Int. Cl.
*H04W 4/02*    (2018.01)
*G01S 5/00*    (2006.01)
(Continued)

(52) U.S. Cl.
CPC ............. *H04W 4/02* (2013.01); *G01S 5/0036* (2013.01); *G01S 5/0072* (2013.01);
(Continued)

(58) Field of Classification Search
CPC ..... H04W 4/023; H04W 4/025; H04W 4/021; H04W 4/02–4/029; H04W 64/00; H04W 64/003; H04W 64/006
(Continued)

(56) References Cited

U.S. PATENT DOCUMENTS 8,417,264 B1 *    4/2013    Whitney ............... H04W 64/00
                                                         455/456.1
2011/0086646 A1    4/2011    Gupta et al.
(Continued)

FOREIGN PATENT DOCUMENTS

CN    101720058    6/2010
CN    102215563    10/2011
(Continued)

OTHER PUBLICATIONS

Extended European Search Report for European Application No. EP 14894256.8, Completed by the European Patent Office, dated Apr. 5, 2017, 13 Pages.
(Continued)

*Primary Examiner* — Allahyar Kasraian
(74) *Attorney, Agent, or Firm* — Plumsea Law Group, LLC (57) ABSTRACT

Provided are a positioning method, device, positioning center, terminal and computer storage medium. The method includes, when receiving a positioning request message requesting to position a first terminal carrying a first terminal identifier of the first terminal, calculating an original position range of the first terminal according to first correspondence relationship between a pre-stored terminal identifier and base station information of a base station in which the terminal is currently located; acquiring second position information of at least three second terminals, whose positioning accuracy is higher than that of the first terminal,
(Continued)

within a target position range determined according to the original position range of the first terminal and a preset regional radius; acquiring measurement result of distances measured by the first terminal from the second terminals according to the first terminal identifier; and calculating first position information of the first terminal according to second position information and measurement result.

16 Claims, 5 Drawing Sheets

(51) Int. Cl.
  *G01S 5/02* (2010.01)
  *G01S 5/14* (2006.01)
  *H04W 4/20* (2018.01)
  *H04W 64/00* (2009.01)

(52) U.S. Cl.
  CPC .......... *G01S 5/0252* (2013.01); *G01S 5/0284* (2013.01); *G01S 5/14* (2013.01); *H04W 4/023* (2013.01); *H04W 4/20* (2013.01); *H04W 64/00* (2013.01); *G01S 5/02* (2013.01)

(58) Field of Classification Search
  USPC ................................ 455/456.1–457
  See application file for complete search history.

(56) References Cited

U.S. PATENT DOCUMENTS

| | | | |
|---|---|---|---|
| 2012/0028650 A1* | 2/2012 | Cooper | G01S 5/0294 455/456.1 |
| 2013/0045759 A1 | 2/2013 | Smith | |
| 2013/0079003 A1* | 3/2013 | Nagaraja | H04W 24/02 455/435.1 |
| 2013/0176874 A1* | 7/2013 | Xu | H04W 52/242 370/252 |
| 2013/0252635 A1 | 9/2013 | Zheng et al. | |
| 2015/0011240 A1 | 1/2015 | Xiao et al. | |

FOREIGN PATENT DOCUMENTS

| | | |
|---|---|---|
| CN | 103517204 | 1/2014 |
| CN | 103685428 | 3/2014 |
| EP | 2327996 | 3/2009 |
| EP | 2818886 | 2/2013 |
| KR | 20120003716 | 1/2012 |
| WO | 2013123874 | 8/2013 |

OTHER PUBLICATIONS

International Search Report for PCT/CN2014/084709, English Translation attached to original, Both completed by the Chinese Patent Office on Mar. 11, 2015, All together 5 Pages.

* cited by examiner

METHOD, SYSTEM, POSITIONING CENTER FOR LOCATING A TERMINAL AND NON-TRANSITORY COMPUTER STORAGE MEDIUM

CROSS-REFERENCE TO RELATED APPLICATION

This application is the U.S. national phase of PCT Application No. PCT/CN2014/084709 filed Aug. 19, 2014, which claims priority to Chinese Application No. 201410262065.3 filed Jun. 12, 2014, the disclosures of which are incorporated in their entirety by reference herein.

TECHNICAL FIELD

The present document relates to mobile communication positioning technologies, and more particularly, to a positioning method, device, positioning center, terminal and computer storage medium.

BACKGROUND

Currently, there are mainly two ways for positioning a terminal including satellite positioning and base station positioning.

Herein, the satellite positioning system includes global positioning system GPS of the United States, global navigation satellite system GLONASS of the Russia and Beidou satellite positioning system of China. The satellite positioning has advantages such as a wide geographical coverage and high positioning accuracy and so on.

Base station positioning refers to a positioning technique that the position of a terminal is determined by acquiring the mobile operator's base station which the terminal accesses. Its advantages include that it is not dependent on GPS and can perform an indoor positioning.

Although the accuracy of the satellite positioning is high, but it cannot perform the indoor positioning, while the base station positioning can perform the indoor positioning, but its positioning accuracy is very low.

SUMMARY

The embodiments of the present document provide a positioning method, device, positioning center, terminal and computer storage medium to improve the positioning accuracy of a terminal.

An embodiment of the present document provides a positioning method for a positioning center, herein the method includes:

calculating an original position range of a first terminal based on a first correspondence relationship between a pre-stored terminal identifier and base station information of a base station in which the terminal is currently located when receiving a positioning request message requesting to position the first terminal, herein, the positioning request message carries a first terminal identifier of the first terminal;

acquiring second position information of at least three second terminals within a target position range, herein positioning accuracy of the second terminals is higher than the positioning accuracy of the first terminal and the target position range is determined according to the original position range of the first terminal and a preset regional radius;

acquiring a measurement result of distances measured by the first terminal from the second terminals based on the first terminal identifier;

calculating first position information of the first terminal based on the second position information and the measurement result.

In the abovementioned positioning method, said calculating an original position range of a first terminal based on a first correspondence relationship between a pre-stored terminal identifier and base station information of a base station in which the terminal is currently located includes:

determining first base station information corresponding to the first terminal identifier carried in the positioning request message according to the first correspondence relationship;

performing a base station positioning based on the first base station information, and calculating the original position range of the first terminal.

In the positioning method described above, said acquiring second position information of at least three second terminals within a target position range includes:

determining second terminal identifiers of the at least three second terminals within a target position range based on the first correspondence relationship;

sending, by the positioning center, a position request message requesting to acquire second position information of the second terminals to the second terminals according to the second terminal identifiers;

acquiring the second position information determined after the second terminals perform a positioning according to the position request message.

In the abovementioned positioning method, said acquiring a measurement result of the distances measured by the first terminal from the second terminals according to the first terminal identifier includes:

sending a measurement request message requesting to measure distances between the first terminal and the second terminals to the first terminal according to the first terminal identifier;

acquiring the measurement result of the distances between the first terminal and the second terminals measured by the first terminal according to the measurement request message.

In the abovementioned positioning method, the measurement request message carries the second terminal identifiers of the second terminals.

In the abovementioned positioning method, said calculating first position information of the first terminal based on the second position information and the measurement result includes:

performing a triangulation according to the second position information and the measurement result to acquire the first position information of the first terminal.

An embodiment of the present document further provides a positioning method for a first terminal, herein the method includes:

receiving a distance measurement message sent by a positioning center after positioning center receives a positioning request message requesting to position the first terminal, herein the distance measurement message requests to measure distances between the first terminal and second terminals, and positioning accuracy of the second terminals is higher than the positioning accuracy of the first terminal;

measuring distances from the second terminals based on the measurement request message to acquire a measurement result;

returning the measurement result to the positioning center so that the positioning center calculates first position information of the first terminal based on the second position information and the measurement result.

In the abovementioned positioning method, the measurement request carries second terminal identifiers of the second terminals; and said measuring distances from the second terminals based on the measurement request message to acquire a measurement result specifically includes:

measuring the distances from the second terminals via a radio signal based on the second terminal identifiers carried in the measurement request message to acquire the measurement result.

An embodiment of the present document further provides a positioning device used in a positioning center, herein the device includes:

a first calculating module, configured to calculate an original position range of a first terminal based on a first correspondence relationship between a pre-stored terminal identifier and base station information of a base station in which the terminal is currently located when receiving a positioning request message requesting to position the first terminal, herein the positioning request message carries a first terminal identifier of the first terminal;

a first acquiring module, configured to acquire second position information of at least three second terminals within a target position range, herein positioning accuracy of the second terminals is higher than the positioning accuracy of the first terminal, and the target position range is determined according to the original position range of the first terminal and a preset regional radius;

a second acquiring module, configured to acquire a measurement result of distances measured by the first terminal from the second terminals based on the first terminal identifier;

a second calculating module, configured to calculate first position information of the first terminal based on the second position information and the measurement result.

In the abovementioned positioning device, the first calculating module includes:

a first determining sub-module, configured to determine first base station information corresponding to the first terminal identifier carried in the positioning request message according to the first correspondence relationship;

a first calculating sub-module, configured to perform a base station positioning based on the first base station information and calculate the original position range of the first terminal.

In the abovementioned positioning device, the first acquiring module includes:

a second determining sub-module, configured to determine second terminal identifiers of the at least three second terminals within the target position range based on the first correspondence relationship;

a first sending sub-module, configured to send, a position request message requesting to acquire the second position information of the second terminals to the second terminals according to the second terminal identifiers by the positioning center;

a first acquiring sub-module, configured to acquire the second position information determined after the second terminals perform a positioning based on the position request message.

In the abovementioned positioning device, the second acquiring module includes:

a second sending sub-module, configured to send a measurement request message requesting to measure the distances between the first terminal and the second terminals to the first terminal according to the first terminal identifier;

a second acquiring sub-module, configured to acquire a measurement result of the distances between the first terminal and the second terminals measured by the first terminal based on the measurement request message.

In the abovementioned positioning device, the measurement request message carries second terminal identifiers of the second terminals.

In the abovementioned positioning device, the second calculating module is configured to, perform a triangulation according to the second position information and the measurement result to acquire the first position information of the first terminal.

An embodiment of the present document further provides a positioning device, configured as a first terminal, herein the device includes:

a receiving module, configured to receive a distance measurement message sent by a positioning center after the positioning center receives a positioning request message requesting to position the first terminal, herein the distance measurement message requests to measure distances between the first terminal and the second terminals, and positioning accuracy of the second terminals is higher than the positioning accuracy of the first terminal;

a distance measuring module, configured to measure the distances from the second terminals based on the measurement request message to acquire a measurement result;

a sending module, configured to return the measurement result to the positioning center so that the positioning center calculates first position information of the first terminal based on second position information and the measurement result.

In the abovementioned positioning device, the measurement request carries second terminal identifiers of the second terminals; and the distance measuring module includes:

a measuring sub-module, configured to measure the distances from the second terminals via a radio signal to acquire the measurement result according to the second terminal identifiers carried in the measurement request message.

An embodiment of the present document further provides a positioning center, herein the positioning center includes any one of the abovementioned positioning device in the positioning center.

The embodiment of the present document further provides a terminal, herein the terminal includes any one of the abovementioned positioning devices in the terminal.

The embodiment of the present document further provides a computer storage medium in which computer-executable instructions are stored for implementing any one of the abovementioned positioning methods.

The embodiments of the present document have at least one of the following beneficial effects.

The embodiment of the present document uses second terminals having a higher positioning accuracy to improve the positioning accuracy of the first terminal with relatively low positioning accuracy through calculation by measuring the distances between the to-be-positioned first terminal and the second terminals;

The embodiment of the present document can perform a high-accurate positioning in a place where there are obstacles and improve the user experience to perform various highly accurate positioning applications.

The embodiment of the present document is applicable not only to a positioning procedure initiated by a terminal but also to a positioning procedure initiated by a positioning service server.

SPECIFIC EMBODIMENTS

In order to make technical problems to be solved, technical solutions and advantages in the embodiments of the present document clearer, description will be made in detail in conjunction with the accompanying drawings and specific embodiments below.

Figure 1:
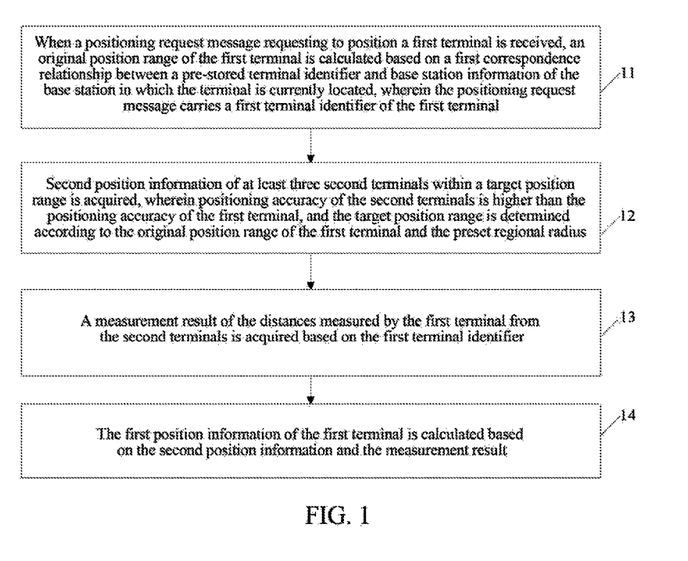
FIG. 1 is a flow chart of a positioning method for a positioning center provided in an embodiment of the present document.

The embodiment of the present document provides a positioning method for a positioning center. As shown in FIG. 1, the method includes the following steps.

In step 11, when a positioning request message requesting to position the first terminal is received, an original position range of the first terminal is calculated according to a first correspondence relationship between a pre-stored terminal identifier and base station information of a base station in which the terminal is currently located, herein the positioning request message carries a first terminal identifier of the first terminal.

In step 12, second position information of at least three second terminals within a target position range is acquired. Herein, the positioning accuracy of the second terminals is higher than the positioning accuracy of the first terminal, and the target position range is determined according to the original position range of the first terminal and a preset regional radius.

In step 13, a measurement result of the distances measured by the first terminal from the second terminals is acquired based on the first terminal identifier.

In step 14, the first position information of the first terminal is calculated based on the second position information and the measurement result.

The abovementioned method provided in the embodiment of the present document uses second terminals having a higher positioning accuracy, improves the positioning accuracy of the first terminal having a lower positioning accuracy through calculation by measuring the distances between the positioned first terminal and the second terminals, and achieves the object of the present document.

Alternatively, the first terminal is a terminal that is not equipped with the GPS positioning, and the second terminals are terminals equipped with the GPS positioning. The first terminal can determine the first position information only through the base station positioning in a place where there are obstacles, such as indoors. According to the method provided in the embodiment of the present document, the first terminal can achieve a highly-accurate positioning in a place where there are obstacles, which improves the user experience and can perform various highly accurate positioning applications.

Of course, in addition to the abovementioned cases, in other cases, using the method provided by the embodiment of the present document to calculate first position information of the first terminal can improve the positioning accuracy of the first terminal as long as the positioning accuracy of the second terminals is higher than the positioning accuracy of the first terminal.

The abovementioned method provided in the embodiment of the present document will be described in the following steps.

In step 11, when a positioning request message requesting to position the first terminal is received, the original position range of the first terminal is calculated according to the first correspondence relationship between the pre-stored terminal identifier and base station information of the base station in which the terminal is currently located. Herein, the positioning request message carries a first terminal identifier of the first terminal.

The positioning request message herein may be sent by the first terminal or sent by a third party platform to the positioning center through a positioning service server. Namely, the embodiment of the present document is applicable not only to a positioning procedure initiated by the terminal but also to a positioning procedure initiated by the positioning service server.

After receiving the positioning request message, the positioning center firstly needs to determine the original position range of the first terminal. Herein, alternatively, calculating the original position range of the first terminal based on the first correspondence relationship between the pre-stored terminal identifier and the base station information of the base station in which the terminal is currently located includes, first base station information corresponding to the first terminal identifier is determined according to the first correspondence relationship;

a base station positioning is performed according to the first base station information to calculate the original position range of the first terminal.

The positioning center is connected with a database pre-storing the first correspondence relationship. The positioning center queries the database after receiving the positioning request message, and determines the first base station information corresponding to the first terminal identifier of the first terminal. The positioning center performs the base station positioning based on the first base station information, and calculates the original position range of the first terminal. Herein, the original position range is a range with relatively low accuracy.

The terminal will send a message to the mobile communication network to handover the base station when a position update occurs at the terminal. Therefore, in the embodiment of the present document, after the mobile communication network detects a position change of the terminal, information of the base station in which the terminal is currently located may be acquired and sent to the positioning center, and the positioning center updates the identifier information of the terminal and the base station information of the base station in which the terminal is located to the database. Therefore, it can be ensured that the latest first correspondence relationship between the identifier information of the terminal and the base station information of the base station in which the terminal is located is always stored in the database. Herein, the terminal may be the first terminal or the second terminal having a relatively high positioning accuracy.

Figure 2:
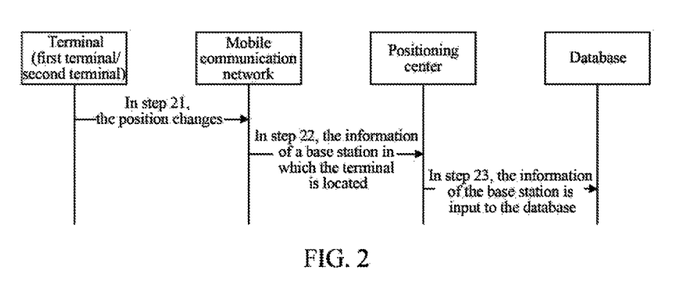
FIG. 2 is a flow chart of updating a correspondence relationship between a terminal identifier and base station information provided in an embodiment of the present document.

The procedure of forming the first correspondence relationship shown in FIG. 2 includes the following steps.

In step 21, the terminal (including the first terminal and the second terminals) accesses the mobile network via a mobile communication signal, and sends a message to the mobile communication network to handover the base station when its position changes.

In step 22, after detecting a change of the terminal position, base station system of the mobile communication network sends information of the base station to which the terminal belongs and so on to the positioning center.

In step 23, after receiving the message that the terminal position changes, the positioning center sends a message to the database to update the base station information of the terminal.

After the original position range of the first terminal is determined, the step 12 needs to be executed to acquire second position information of at least three second terminals within the target position range. Herein, the positioning accuracy of the second terminals is higher than that of the first terminal, and the target position range is determined based on the original position range of the first terminal and a preset regional radius.

The second position information may be acquired through the following two ways.

<Way One>

Step 13 includes:

second terminal identifiers of at least three second terminals within a target position range is determined according to the first correspondence relationship;

the positioning center sends a position request message requesting to acquire second position information of the second terminals to the second terminals according to the second terminal identifiers; and the second position information which is determined by the second terminals after positioning according to the position request message is acquired.

In an embodiment of the present document, alternatively, the target region range is determined according to a preset regional radius with the original position range of the first terminal as a center point. Then second terminal identifiers of at least three second terminals under the base station within the target area range is determined according to the first correspondence relationship between the terminal identifier and the base station information. The terminal identifier is information which can identify the terminal, may be an International Mobile Subscriber Identification Number IMSI or a Mobile Subscriber International ISDN/PSTN number MSISDN. At this time, the positioning center requests the second terminal to locate itself and returns the accurate second positioning information to the positioning center. Since the positioning accuracy of the second terminals is higher than that of the first terminal, the second position information acquired by the positioning center is also relatively accurate.

In addition, for the second terminals having a relatively high positioning accuracy, the second positioning information of the second terminals may be directly stored in the database to form a second correspondence relationship between the terminal identifier and the position information, so that the step 13 may be directly realized through the following way.

<Way Two>

Step 12 includes:

second terminal identifiers of at least three second terminals within a target position range is determined according to the second correspondence relationship between the pre-stored terminal identifier and the position information of the terminal;

the second position information is determined according to the second terminal identifiers of the second terminals and the second correspondence relationship.

In the way two, the target region range needs firstly to be determined similarly. Further, the second terminal identifiers of the at least three second terminals within the target region range is determined, and the second position information is directly acquired according to the second correspondence relationship.

Regardless which way is used to acquire the second position information, step 13 needs to be executed in order to acquire a measurement result of the distances measured by the first terminal from the second terminals based on the first terminal identifier.

Alternatively, step 13 includes:

a measurement request message requesting to measure the distances between the first terminal and the second terminals is sent to the first terminal according to the first terminal identifier;

a measurement result of the distances measured by the first terminal between the first terminal and the second terminals is acquired based on the measurement request message.

Herein, the measurement request message needs to carry the second terminal identifiers of the second terminals.

Alternatively, the first terminal measures the distances from the second terminals via a radio signal and acquires a measurement result according to the second terminal identifiers carried in the measurement request message.

Specifically, the first terminal sends the second terminals a measurement request message requesting to measure the distances via the radio signal according to the second terminal identifiers, and the corresponding time point is denoted as T1. The main consideration herein is that the radio signal has a fixed transmission rate. The second terminals immediately return a response message to the first terminal via the radio signal upon receiving the request message sent by the first terminal. The time point at which the first terminal receives the response message returned by the second terminals is T2. The first terminal may calculate the distances between the first terminal and the second terminals based on the time difference between T2 and T1 as well as the transmission rate of the radio signal.

After the first terminal measures the distances from the second terminals, the positioning center acquires the measurement result.

Then the step 14 is executed. The positioning center calculates the first position information of the first terminal based on the second position information and the measurement result.

Alternatively, step 14 specifically includes:

a triangulation is performed according to the second position information and the measurement result to acquire the first position information of the first terminal.

Figure 3:
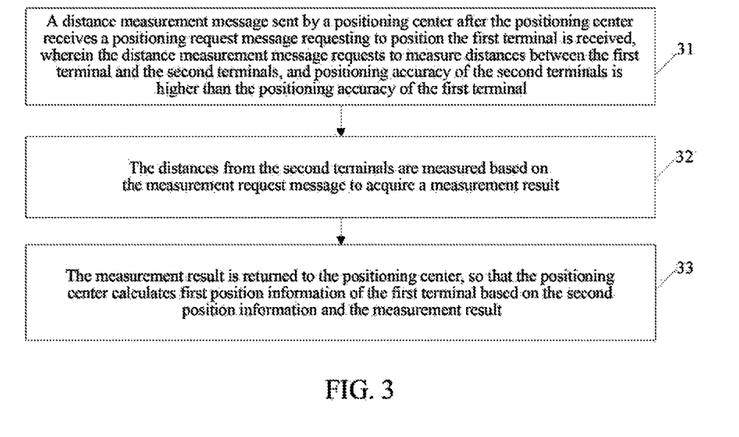
FIG. 3 is a flow chart of a positioning method for a terminal provided in an embodiment of the present document.

Corresponding to the positioning method for the positioning center, the embodiment of the present document further provides a positioning method for a first terminal. The method is shown in FIG. 3 and includes the following steps.

In step 31, a distance measurement message sent by the positioning center is received after the positioning center receives the positioning request message requesting to position the first terminal. Herein the distance measurement message requests to measure the distances between the first terminal and the second terminals, and the positioning accuracy of the second terminals is higher than the positioning accuracy of the first terminal.

In step 32, the distances from the second terminals is measured based on the measurement request message to acquire a measurement result.

In step 33, the measurement result is returned to the positioning center so that the positioning center calculates the first position information of the first terminal based on the second position information and the measurement result.

In the abovementioned positioning method, the measurement request carries the second terminal identifiers of the second terminals.

Measuring the distances from the second terminals based on the measurement request message to acquire a measurement result specifically includes:

the distances from the second terminals is measured via a radio signal based on the second terminal identifiers carried in the measurement request message to acquire the measurement result.

Figure 4:
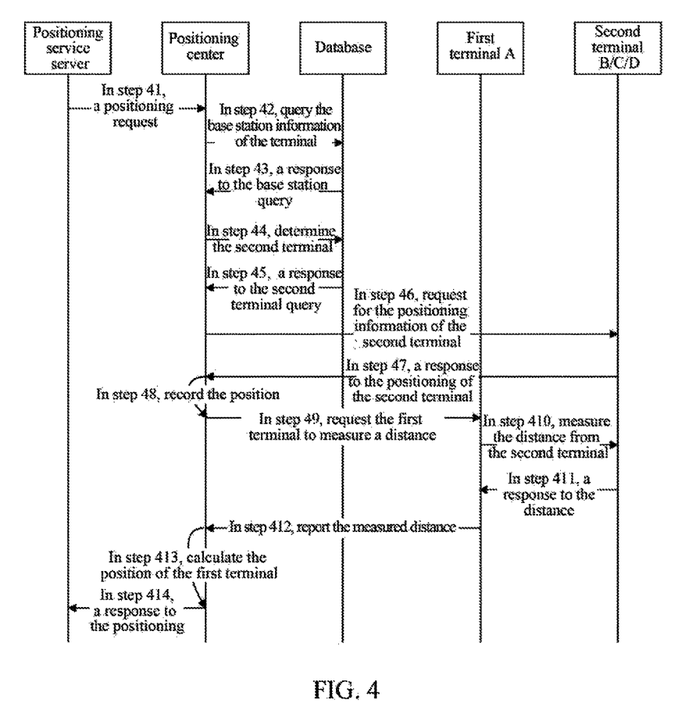
FIG. 4 is a schematic diagram of an overall procedure of the positioning method provided in an embodiment of the present document.

In the following, the overall procedure of the positioning method provided in the embodiment of the present document will be described in detail. As shown in FIG. 4, the method includes the following steps.

In step 41, the positioning service server initiates a positioning request. Of course, the positioning request may be initiated by the first terminal A, and if it is the first terminal A initiating the positioning, the first terminal A is equivalent to the positioning service server, The positioning request may also be initiated by another third party platform or a third terminal or the like accessing the positioning service server.

In step 42, the positioning center initiates a request to the database for querying the first base station information of the first terminal A.

In step 43, the database returns the first base station information to the positioning center.

In step 44, the positioning center calculates the original position range of the first terminal A based on the first base station information, and then queries the database for the second terminal identifiers of the at least three second terminals within the preset regional radius region using the original position range of the first terminal A as a center point. Herein, the positioning accuracy of the second terminal B/C/D is higher than that of the first terminal A.

In step 45, the database returns the second terminal identifier of the second terminal B/C/D to the positioning center.

In step 46, the positioning center sends a message to the second terminal and requires it to perform a high-accuracy positioning.

In step 47, the second terminal B/C/D performs the positioning, and sends the determined second position information to the positioning center after the positioning completes.

In step 48, the positioning center records the second position information of each second terminal.

In step 49, after receiving the second position information of one second terminal each time, the positioning center sends the second terminal identifier of the second terminal to the first terminal immediately, and requires the first terminal to measure the distance from the second terminal.

In step 410, the first terminal sends a measurement request message to the second terminal via a radio signal.

In step 411, after receiving the measurement request message from the first terminal, the second terminal sends a response message to the first terminal immediately.

In step 412, the first terminal sends the measured distance from the second terminal as the measurement result to the positioning center.

In step 413, when the positioning center collects the second position information of the at least three second terminals and their corresponding distances from the first terminal, the positioning center performs a triangulation to calculate the first position information of the first terminal.

In step 414, the positioning center sends the first position information to the positioning service server.

The positioning method provided in the embodiment of the present document is applicable not only to a positioning procedure initiated by a terminal but also to a positioning procedure initiated by a positioning service server. By using the second terminals having a higher positioning accuracy and measuring the distances between the positioned first terminal and the second terminals, the positioning accuracy of the first terminal having a relatively low positioning accuracy is improved through the calculation. Furthermore, a high-accuracy positioning can be achieved in a place where there are obstacles, and the user experience is improved. Furthermore, a variety of highly accurate positioning applications can be performed.

Figure 5:
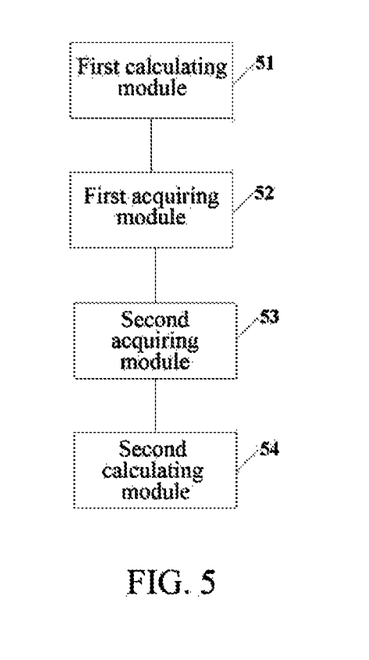
FIG. 5 is a schematic diagram of a structure of a positioning device for a positioning center provided in an embodiment of the present document.

The embodiment of the present document further provides a positioning device for a positioning center. As shown in FIG. 5, the device includes:

first calculating module 51, configured to calculate an original position range of the first terminal according to a first correspondence relationship between a pre-stored terminal identifier and base station information of a base station currently in which the terminal is located when receiving a positioning request message requesting to position the first terminal, herein the positioning request message carries a first terminal identifier of the first terminal;

first acquiring module 52, configured to acquire second position information of at least three second terminals within the target position range, herein the positioning accuracy of the second terminals is higher than the positioning accuracy of the first terminal, and the target position range is determined according to the original position range of the first terminal and the preset regional radius;

second acquiring module 53, configured to acquire a measurement result of the distances measured by the first terminal from the second terminals based on the first terminal identifier.

second calculating module 54, configured to calculate the first position information of the first terminal based on the second position information and the measurement result.

In the abovementioned positioning device, the first calculating module 51 includes:

a first determining sub-module, configured to determine first base station information corresponding to the first terminal identifier carried in the positioning request message according to the first correspondence relationship;

a first calculating sub-module, configured to perform a base station positioning based on the first base station information and calculate the original position range of the first terminal.

In the abovementioned positioning device, the first acquiring module 52 includes:

a second determining sub-module, configured to determine second terminal identifiers of at least three second terminals within the target position range based on the first correspondence relationship;

a first sending sub-module, configured to send a position request message requesting to acquire the second position information of the second terminal to the second terminals according to the second terminal identifiers;

a first acquiring sub-module, configured to acquire the second position information determined after the second terminals perform the positioning based on the position request message.

In the abovementioned positioning device, the second acquiring module 53 includes:

a second sending sub-module, configured to send a measurement request message requesting to measure the distances between the first terminal and the second terminals to the first terminal according to the first terminal identifier;

a second acquiring sub-module, configured to acquire a measurement result of the distances between the first terminal and the second terminals measured by the first terminal based on the measurement request message.

In the abovementioned positioning device, the measurement request message carries second terminal identifiers of the second terminals.

In the abovementioned positioning device, the second calculating module 54 is configured to, perform a triangulation according to the second position information and the measurement result to acquire first position information of the first terminal.

Figure 6:
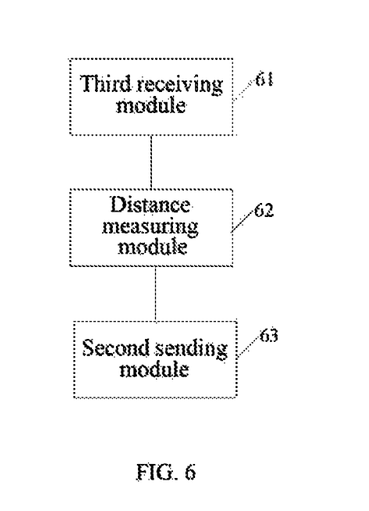
FIG. 6 is a schematic diagram of a structure of a positioning device for a terminal provided in an embodiment of the present document.

The embodiment of the present document further provides a positioning device configured as a first terminal. As shown in FIG. 6, the device includes:

a third receiving module 61, configured to receive a distance measurement message sent by the positioning center after receiving a positioning request message requesting to position the first terminal, herein the distance measurement message requests to measure the distances between the first terminal and the second terminals, and the positioning accuracy of the second terminals is higher than the positioning accuracy of the first terminal;

a distance measuring module 62, configured to measure the distances from the second terminals based on the measurement request message to acquire a measurement result;

a second sending module 63, configured to return the measurement result to the positioning center so that the positioning center calculates the first position information of the first terminal based on the second position information and the measurement result.

In the abovementioned positioning device, the measurement request carries second terminal identifiers of the second terminals.

The distance measuring module 62 includes:

a measuring sub-module, configured to measure the distances from the second terminals via a radio signal to acquire the measurement result according to the second terminal identifiers carried in the measurement request message.

Figure 7:
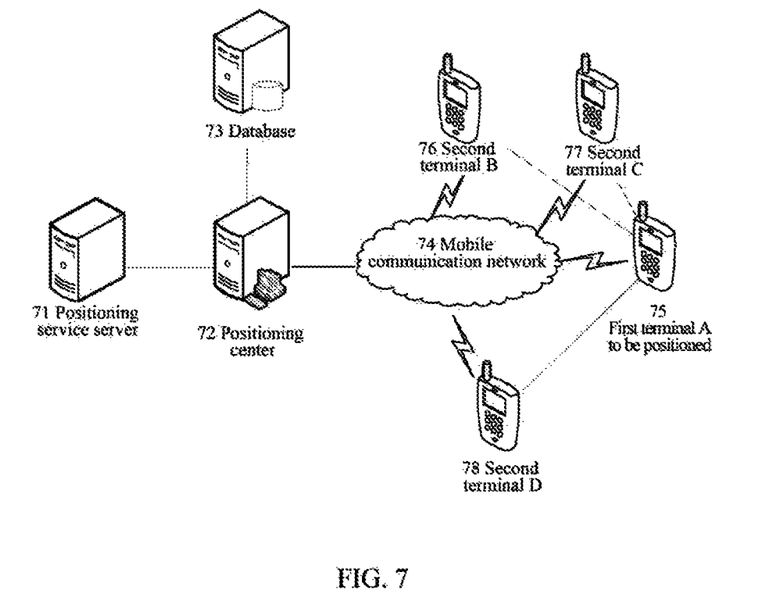
FIG. 7 is a schematic diagram of an overall architecture of a positioning system provided in an embodiment of the present document.

The embodiment of the present document further provides a schematic diagram of the overall architecture of the positioning system. As shown in FIG. 7, the overall architecture of the positioning system includes the following.

A positioning service server 71 connected to a positioning center 72 is configured to perform the service logic processing, send a positioning request and receive position information from the positioning center 72.

The positioning center 72 connected to the positioning service server 71, a database 73 and a mobile communication network 74 is configured to receive a positioning request from the positioning service server 71 and return a positioning result, send a query to the database 73 for querying the base station information of the positioned terminal and receive a result, select second terminals with the accurate positioning capability, send a message to the second terminal B/C/D via the mobile communication network 74, require the second terminal to perform a accurate positioning, send a message to the first terminal A via the mobile network 74, and require the first terminal A to measure the distance from the second terminal B/C/D, and calculate the first position information of the first terminal A through the triangulation based on the second position information of the second terminal B/C/D and the distance between the first terminal A and the second terminal B/C/D;

The database 73 connected to the positioning center 72 is configured to save the base station information to which the terminal belongs, the terminal position information and the terminal positioning capability information and so on;

The first terminal A is connected to the second terminal B/C/D through the mobile communication network 74, and is configured to initiate a distance measuring request to the second terminal B/C/D and calculate its distance from the second terminal based on the response returned by the second terminal.

The second terminal B/C/D is connected to the mobile communication network 74 and the first terminal A and is configured to measure the high-accuracy position of the second terminal B/C/D and assists the first terminal A to measure the distance between the first terminal A and the second terminal B/C/D.

The embodiment of the present document further provides a positioning center, herein the positioning center includes any one of the positioning devices for the positioning center.

The embodiment of the present document further provides a terminal, herein the terminal includes any one of the abovementioned positioning device in the terminal.

The embodiment of the present document further provides a computer storage medium in which computer-executable instructions are stored for implementing the positioning methods described above.

In the several embodiments provided in the present document, it should be understood that the disclosed device and method may be implemented in other manners. The device embodiments described above are merely illustrative. For example, the division of the units is only one division based on logical functions. In actual implementation, there may be additional division ways, for example, multiple units or components may be combined, or may be integrated into another system, or some features may be ignored or not implemented. In addition, the coupling, or direct coupling, or communication connection of the shown or discussed components may be an indirect coupling or communication connection through some interfaces, devices or units, and may be electrical, mechanical, or in any other form.

The units described above as separate components may or may not be physically separated, and the components displayed as units may or may not be physical units, that is, they may be located in one place or distributed over a plurality of network units. Some or all of the units may be selected according to actual needs to realize the object of the solution of the present embodiment.

In addition, the functional units in the embodiments of the present document may be all integrated in one processing unit, or each unit may be separately provided as one unit, or two or more units may be integrated in one unit. The abovementioned integrated unit may be realized in the form of hardware, or the form of hardware and software functional unit.

It can be appreciated by the ordinary skilled in the art that all or part of the steps implementing the abovementioned method embodiments may be accomplished by a program instructing the related hardware. The program can be stored in a computer readable storage medium. When the program is executed, the steps including the abovementioned method embodiment can be executed. The abovementioned storage medium includes any medium that can store program codes, such as a potable storage device, a random access memory (called as RAM), a read-only memory (called as ROM), a magnetic disk or an optical disk or the like.

Alternatively, the integrated units described above in the present document may be stored in a computer-readable storage medium if implemented in the form of software function modules and sold or used as standalone products. Based on the understanding, the essence or a part as a contribution to the related art of the technical solution of the embodiments of the present document may be embodied, in the form of a software product. The software is stored in a storage medium and includes a plurality of instructions for enabling a computer device (may be a personal computer, a server, or a network device, etc.) to perform all or part of the methods described in various embodiments of the present document. The abovementioned storage medium includes various mediums that can store program codes, such as a portable storage device, an RAM, an ROM, a magnetic disk, or an optical disk or the like.

The above description is only specific embodiments of the present document, but the protection scope of the present document is not limited thereto. Within the technical scope disclosed in the present document, any changes or replacements easily thought by those skilled in the art should be included within the protection scope of the present document. Accordingly, the protection scope of the present document should be determined by the scope of the claims.

What is claimed is:

1. A positioning method for a positioning center, comprising:
   calculating an original position range of a first terminal based on a first correspondence relationship between a pre-stored terminal identifier and base station information of a base station in which the first terminal is currently located when receiving a positioning request message requesting to position the first terminal, wherein, the positioning request message carries a first terminal identifier of the first terminal;
   acquiring second position information of at least three second terminals within a target position range, wherein positioning accuracy of the second terminals is higher than the positioning accuracy of the first terminal, and the target position range is determined according to the original position range of the first terminal and a preset regional radius;
   acquiring a measurement result of distances measured by the first terminal from the second terminals based on the first terminal identifier;
   calculating first position information of the first terminal based on the second position information and the measurement result,
   wherein receiving a measurement request message sent by the positioning center after the positioning center receives the positioning request message requesting to position the first terminal, wherein the measurement request message requests to measure distances between the first terminal and the second terminals;
   measuring distances from the second terminals based on the measurement request message to acquire the measurement result; and
   returning the measurement result to the positioning center, so that the positioning center calculates the first position information of the first terminal based on the second position information and the measurement result,
   wherein, the measurement request message carries second terminal identifiers of the second terminals; and
   said measuring distances from the second terminals based on the measurement request message to acquire the measurement result specifically comprises:
   measuring the distances from the second terminals via a radio signal based on the second terminal identifiers carried in the measurement request message to acquire the measurement result.

2. The positioning method of claim 1, wherein, said calculating an original position range of a first terminal based on a first correspondence relationship between a pre-stored terminal identifier and base station information of a base station in which the terminal is currently located comprises:
   determining first base station information corresponding to the first terminal identifier carried in the positioning request message according to the first correspondence relationship;
   performing a base station positioning based on the first base station information, and calculating the original position range of the first terminal.

3. The positioning method of claim 1, wherein, said acquiring second position information of at least three second terminals within a target position range comprises:
   determining second terminal identifiers of the at least three second terminals within the target position range based on the first correspondence relationship;
   sending, by the positioning center, a position request message requesting to acquire second position information of the second terminals to the second terminals according to the second terminal identifiers;
   acquiring the second position information determined after the second terminals perform a positioning according to the position request message.

4. The positioning method of claim 1, wherein, said acquiring a measurement result of the distances measured by the first terminal from the second terminals according to the first terminal identifier comprises:
   sending a measurement request message requesting to measure distances between the first terminal and the second terminals to the first terminal according to the first terminal identifier;
   acquiring the measurement result of the distances between the first terminal and the second terminals measured by the first terminal according to the measurement request message.

5. The positioning method of claim 4, wherein, the measurement request message carries the second terminal identifiers of the second terminals.

6. The positioning method of claim 1, wherein, said calculating first position information of the first terminal based on the second position information and the measurement result comprises:
   performing a triangulation according to the second position information and the measurement result to acquire the first position information of the first terminal.

7. A non-transitory computer storage medium storing computer-executable instructions, wherein the computer-executable instructions are used for implementing the positioning method of claim 1.

8. A non-transitory computer storage medium storing computer-executable instructions, wherein the computer-executable instructions are used for implementing the positioning method of claim 2.

9. A positioning system, comprising a first positioning device used in a positioning center and a second positioning device used in a first terminal, wherein the first positioning device comprises a first processor and a first storage device, wherein the first storage device stores processor-executable programs, and the programs comprise:
   a first calculating module, configured to calculate an original position range of a first terminal based on a first correspondence relationship between a pre-stored terminal identifier and base station information of a base station in which the first terminal is currently located when receiving a positioning request message requesting to position the first terminal, wherein the positioning request message carries a first terminal identifier of the first terminal;
   a first acquiring module, configured to acquire second position information of at least three second terminals within a target position range, wherein positioning accuracy of the second terminals is higher than the positioning accuracy of the first terminal, and the target position range is determined according to the original position range of the first terminal and a preset regional radius;
   a second acquiring module, configured to acquire a measurement result of distances measured by the first terminal from the second terminals based on the first terminal identifier; and
   a second calculating module, configured to calculate first position information of the first terminal based on the second position information and the measurement result,
wherein the second positioning device comprises a second processor and a second storage device, wherein the second storage device stores processor-executable programs, and the programs comprise:
   a receiving module, configured to receive a measurement request message sent by the positioning center after the positioning center receives the positioning request message requesting to position the first terminal, wherein the measurement request message requests to measure distances between the first terminal and the second terminals;
   a distance measuring module, configured to measure the distances from the second terminals based on the measurement request message to acquire the measurement result; and
   a sending module, configured to return the measurement result to the positioning center, so that the positioning center calculates the first position information of the first terminal based on the second position information and the measurement result,
wherein, the measurement request message carries second terminal identifiers of the second terminals; and
   the distance measuring module comprises a third processor and a third storage device, wherein the third storage device stores processor-executable programs, and the programs comprise:
   a measuring sub-module, configured to measure the distances from the second terminals via a radio signal to acquire the measurement result according to the second terminal identifiers carried in the measurement request message.

10. The positioning system of claim 9, wherein, the first calculating module comprises a fourth processor and a fourth storage device, wherein the fourth storage device stores processor-executable programs, and the programs comprise:
   a first determining sub-module, configured to determine first base station information corresponding to the first terminal identifier carried in the positioning request message according to the first correspondence relationship; and
   a first calculating sub-module, configured to perform a base station positioning based on the first base station information and calculate the original position range of the first terminal.

11. The positioning system of claim 9, wherein, the first acquiring module comprises a fifth processor and a fifth storage device, wherein the fifth storage device stores processor-executable programs, and the programs comprise:
   a second determining sub-module, configured to determine second terminal identifiers of the at least three second terminals within the target position range based on the first correspondence relationship;
   a first sending sub-module, configured to, send a position request message requesting to acquire the second position information of the second terminals to the second terminals according to the second terminal identifiers by the positioning center; and
   a first acquiring sub-module, configured to acquire the second position information determined after the second terminals perform a positioning based on the position request message.

12. The positioning system of claim 9, wherein, the second acquiring module comprises a sixth processor and a sixth storage device, wherein the sixth storage device stores processor-executable programs, and the programs comprise:
   a second sending sub-module, configured to send a measurement request message requesting to measure the distances between the first terminal and the second terminals to the first terminal according to the first terminal identifier; and
   a second acquiring sub-module, configured to acquire a measurement result of the distances between the first terminal and the second terminals measured by the first terminal based on the measurement request message.

13. The positioning system of claim 12, wherein, the measurement request message carries second terminal identifiers of the second terminals.

14. The positioning system of claim 9, wherein, the second calculating module is configured to,
   perform a triangulation according to the second position information and the measurement result to acquire the first position information of the first terminal.

15. A positioning center comprising the first positioning device of the positioning system of claim 9.

16. A terminal comprising the second positioning device of the positioning system of claim 9.

* * * * *